Patented June 28, 1927.

1,634,221

UNITED STATES PATENT OFFICE.

DONALD K. TRESSLER, OF PITTSBURGH, PENNSYLVANIA, ASSIGNOR TO LARROWE CONSTRUCTION COMPANY, OF DETROIT, MICHIGAN, A CORPORATION OF MICHIGAN.

MANUFACTURE OF BETAINE HYDROCHLORIDE, ETC.

No Drawing.   Application filed July 2, 1924. Serial No. 723,684.

This invention relates to the manufacture of betaine hydrochloride, glutamic acid and potash salts, from the residual liquors of the beet sugar industry remaining after the separation and recovery of available sugar from the molasses.

The beet sugar molasses remaining after the separation of crystallizable sugar is not suitable for table use and must be utilized in other ways. The maximum quantity of available sucrose is usually extracted from the molasses by a suitable saccharate process such as the Steffen process. The residue is the waste water which contains the non-sugars. On the dry basis, this waste water contains approximately 20 per cent of glutamic acid, about 20 per cent of betaine, and about 35 per cent of inorganic salts, particularly sodium and potassium salts.

The molasses is sometimes used as a source of alcohol and yeast by fermentation, but this also leaves distillery slops or vinasses which contain the non-sugars of the molasses.

The present invention relates to the treatment of such residual waters for the recovery of betaine hydrochloride, glutamic acid and inorganic salts therefrom. These waste waters, as above pointed out, contain large amounts of these constituents and their profitable utilization, which is made possible by the process of the present invention, is of economic importance.
According to the present invention, the waste water, i. e., the saccharate waste water or the distillery slops or vinasses remaining after fermentation, are treated for the separation and recovery first of betaine hydrochloride and inorganic chlorides without appreciable admixture of glutamic acid and the glutamic acid is then separately recovered by a separate subsequent operation.

I have discovered that if the desaccharified molasses is kept cool and hydrochloric acid or gaseous hydrogen chloride added, only betaine hydrochloride and the inorganic chlorides are precipitated while the glutamic acid remains in solution; and that after filtration, the glutamic acid may be precipitated as the hydrochloride by heating the mother liquor, for example at about 85° C. for about two hours, and by then cooling.

The glutamic acid apparently does not occur in the molasses either in the free state or as a glutamate, but in the form of some compound or compounds, probably as an amide which is soluble in concentrated hydrochloric acid; and such compound or compounds are hydrolyzed by heating in an acid solution, thus freeing the glutamic acid, which forms the hydrochloride.

The present invention takes advantage of these properties and reactions of glutamic acid and its compounds. By carrying out the first treatment with acid at a low temperature, the separation of the betaine hydrochloride and inorganic chlorides is effected without precipitation of the glutamic acid; and the glutamic acid is subsequently precipitated by heating the mother liquor to hydrolyze the glutamic acid compound and form the hydrochloride which is nearly insoluble in concentrated hydrochloric acid.

The first precipitate of betaine hydrochloride and inorganic chlorides may be further treated for the separation of the betaine hydrochloride therefrom, for example, by extraction with methanol or ethanol, preferably at or near the boiling point, and crystallizing the betaine hydrochloride from the resulting solution. The betaine hydrochloride can thus be obtained in a nearly pure form by cooling the alcoholic solution, and a further amount of the betaine hydrochloride crystals can be obtained by filtering off the crystals first obtained, evaporating the mother liquor and repeating the crystallization.

The glutamic acid hydrochloride precipitated by the second step of the process may be separated from the mother liquor by filtration and the filter-cake thus obtained may also contain carbon. The glutamic acid hydrochloride may be easily extracted from the filter-cake by a relatively small quantity of hot water. This solution may then be decolorized with activated carbon or bone black and the glutamic acid hydrochloride precipitated in pure form by saturating the solution with gaseous hydrogen chloride. The glutamic acid may be precipitated as such by the addition of sufficient sodium carbonate or other alkali to neutralize the hydrochloric acid which is combined with glutamic acid as hydrochloride.

The inorganic salts remaining after the separation of the betaine hydrochloride can be further purified or they may be used directly for fertilizer or other purposes.

The invention will be further illustrated by the following specific example, but it will be understood that the invention is not limited thereto:

Steffen's waste water or other desaccharified molasses having a specific gravity between 1.29 and 1.40, is placed in a suitable container and saturated with gaseous hydrogen chloride, care being taken to pass the gas in slowly and to keep the solution cool, i. e., below 70° C.

Instead of gaseous hydrogen chloride, hydrochloric acid may be added in other ways. The desaccharified molasses can, for example, be evaporated to a density of about 1.42 and two volumes of strong hydrochloric acid then added in very small successive portions, care being taken to keep the solution cool during these additions. Instead of adding the hydrochloric acid to the concentrated molasses, the desaccharified molasses of a density of about 1.42 may be very slowly stirred into about twice its volume of concentrated hydrochloric acid.

I consider the first of these procedures as more desirable and advantageous, i. e., the passing in of hydrogen chloride gas to obtain complete saturation of the solution.

After allowing the solution which has been saturated with hydrogen chloride to stand for some time (18 hours or longer), preferably in a cool place, the precipitate formed is filtered from the mother liquor, preferably in a basket centrifuge.

The precipitate thus obtained and separated consists of inorganic chlorides, chiefly potassium chloride, and also betaine hydrochloride, and is free or substantially free from glutamic acid hydrochloride.

In order to separate the betaine hydrochloride from the mixed salt crystals, these crystals, after having been freed or nearly freed from mother liquor, are extracted with methanol or ethanol, preferably at a temperature near its boiling point. The extraction may be carried out in a continuous extraction apparatus of the type of a Soxhlet extractor. The betaine hydrochloride dissolves in the methanol or ethanol and crystallizes therefrom on cooling the saturated solution. The yield obtained at this stage, after continued crystallization and filtration of the mother liquor, varies somewhat, depending upon the concentration of the original desaccharified molasses, but is roughly about 11 per cent of the weight of the dry matter of the desaccharified molasses.

The residue insoluble in alcohol, remaining after the extraction of the betaine hydrochloride, consists chiefly of potassium chloride and a lesser amount of sodium chloride and constitutes, for example, around 30 per cent of the weight of the dry matter of the waste water.

The mother liquor from the precipitation of inorganic chlorides and betaine hydrochloride is then treated for the separation of glutamic acid hydrochloride therefrom. This separation is effected by heating the solution, e. g., at temperatures of 70 to 95° C. At higher temperatures, precipitation takes place rapidly and increased amounts of carbon are formed. At lower temperatures, a longer period of time is required, and less carbon is formed. At 95° C., for example, the precipitation takes place in about 8 to 10 minutes; at 90° C., in about 20 to 30 minutes; at 85° C., in about 2 hours; at 80° C., in about 3 hours; at 70° C., in about 13 hours, etc. Under these conditions, the glutamic acid is liberated and a portion of the sugars (where the sugars have not been completely removed) are dehydrated and decomposed with the resulting liberation of free carbon or carbonaceous matter. Upon cooling, the glutamic acid crystallizes as the hydrochloride. The crystals thus formed can be recovered by filtration, preferably in a basket centrifuge, giving a mixture of glutamic acid hydrochloride and more or less free carbon.

The glutamic acid may be liberated without decomposing the sugars if the solution is diluted with two to three volumes of water prior to heating the mother liquor to a temperature of about 85° C. Glutamic acid hydrochloride, however, is somewhat soluble in dilute hydrochloric acid solutions, and, therefore, in order to precipitate the glutamic acid hydrochloride, the diluted solution must be saturated with gaseous hydrogen chloride or otherwise treated for the precipitation of the glutamic acid hydrochloride.

When the glutamic acid so obtained contains free carbon, the glutamic acid hydrochloride may be separated from the carbon by extraction with water, preferably hot water, thus dissolving the glutamic acid hydrochloride. The solution can then be decolorized with activated carbon or bone black. From the resulting solution the glutamic acid may be precipitated by adding just sufficient alkali or alkali carbonate to neutralize the hydrochloric acid of the hydrochloride. Or the glutamic acid may be precipitated as the hydrochloride by saturating the solution with gaseous hydrogen chloride. The yield of glutamic acid hydrochloride varies somewhat, but is usually around 19 per cent of the weight of the dry matter of the desaccharified molasses.

After the glutamic acid hydrochloride has been separated, a further yield of betaine hydrochloride and inorganic salts may be obtained by evaporating the main body of the solution in vacuo at a temperature not exceeding about 50° C. until the solution just remains liquid when cooled to room temperature. After cooling, the solution is allowed to stand for about 24 hours, after which the mixture of betaine hydrochloride and inorganic salts is filtered off, preferably with a basket centrifuge, and the betaine hydrochloride is separated from the inorganic salts by extraction with methanol or ethanol as described above.

A still further yield of betaine hydrochloride may be obtained from the main body of the solution remaining from the preceding step by concentrating the solution in vacuo at a temperature not exceeding about 50° C. until the water is practically all driven off, and then by adding the residue, with stirring, to two volumes of absolute ethyl alcohol.

Crude betaine hydrochloride is precipitated and may be purified by recrystallization from methanol or ethanol.

The total yield of betaine hydrochloride is approximately 20 per cent of the weight of the dry matter of the desaccharified molasses.

The alcohol in the mother liquor from the final precipitation of betaine may be recovered by distillation. Also other useful substances may be recovered from the residue.

It will thus be seen that the present invention provides an improved method for the manufacture of betaine hydrochloride, glutamic acid and potassium salts from desaccharified beet molasses or from distillers' slops from the manufacture of alcohol from beet molasses.

The present invention presents many advantages, among which may be mentioned the following: A nearly quantitative separation of betaine hydrochloride, glutamic acid and potassium salts from the sugars, organic acids, salts, etc., which constitute the remainder of the desaccharified molasses, is effected; the betaine hydrochloride is easily separated in a pure form free from glutamic acid hydrochloride; the glutamic acid is separated in a pure form from desaccharified molasses without the use of any expensive organic solvent, such as absolute ethyl alcohol; the betaine hydrochloride and potassium and sodium chlorides are precipitated from the desaccharified molasses without permitting any decomposition of the sugars or other organic constituents of the solution, so that these substances are obtained in a nearly pure form and require but a single crystallization to purify them sufficiently for pharmaceutical purposes.

The present invention is particularly valuable for the treatment of Steffen's waste water from which the recoverable sugar has been separated by the Steffen's saccharate process. It is applicable however to other waste waters from beet sugar manufacture, including the distillers' slops or vinasses remaining after fermentation. In the fermentation process, however, some of the nitrogenous constituents of the liquor are consumed by the yeast, so that the composition of the slops or vinasses differs somewhat from that of the waste water from the saccharate process. The waste water from the saccharate process enables a large and satisfactory yield of betaine hydrochloride and of glutamic acid to be recovered by the process of the present invention.

In the accompanying claims, in referring to the residual liquors of beet molasses, I include the waste liquors from the Steffen's or other saccharate process as well as distillers' slops or vinasses, etc., while in the more specific claims, the treatment of the saccharate waste liquors is more particularly covered.

I claim:

1. A process of recovering betaine hydrochloride and glutamic acid from the residual liquors of beet molasses which comprises adding hydrochloric acid to the cool solution, thus precipitating betaine hydrochloride and inorganic chlorides and subsequently heating the remaining solution to precipitate the glutamic acid as glutamic acid hydrochloride.

2. A process of recovering betaine hydrochloride and glutamic acid from the residual liquors of beet molasses which comprises adding hydrochloric acid to the cool solution, thus precipitating betaine hydrochloride and inorganic chlorides and subsequently heating the remaining solution to precipitate the glutamic acid as glutamic acid hydrochloride, the precipitation of the glutamic acid hydrochloride being effected by heating the solution to a temperature of about 80° C. to 85° C. and by subsequent cooling.

3. The method of purifying glutamic acid hydrochloride from admixed carbon, which comprises dissolving the glutamic acid hydrochloride in water, separating it from admixed carbon and precipitating the glutamic acid as hydrochloride from the resulting solution.

4. A process of recovering betaine hydrochloride and glutamic acid from the residual liquors of beet molasses which comprises adding hydrochloric acid to the cool solution, thus precipitating betaine hydrochloride and inorganic chlorides, subsequently heating the remaining solution to precipitate glutamic acid as glutamic acid hydrochloride, and, after filtration, evaporating the solution in vacuo at a temperature not exceeding about 50° C. until the solution just remains liquid when cooled to room temperature, cooling the liquor and recovering a further amount of betaine hydrochloride and inorganic salts therefrom.

5. A process of recovering betaine hydrochloride and glutamic acid from saccharate waste water remaining after the desaccharification of beet molasses, which comprises adding hydrochloric acid to the cool solution, thus precipitating betaine hydrochloride and inorganic chlorides and subsequently heating the remaining solution to precipitate the glutamic acid as glutamic acid hydrochloride.

6. A process of recovering betaine hydrochloride and glutamic acid from saccharate waste water remaining after the desaccharification of beet molasses, which comprises adding hydrochloric acid to the cool solution, thus precipitating betaine hydrochloride and inorganic chlorides and subsequently heating the remaining solution to precipitate the glutamic acid as glutamic acid hydrochloride, the precipitation of the glutamic acid hydrochloride being effected by heating the solution to a temperature of about 80° C. to 85° C. and by subsequent cooling.

7. A process of recovering betaine hydrochloride and glutamic acid from the residual liquors of beet molasses which comprises adding hydrochloric acid to the cool solution, thus precipitating betaine hydrochloride and inorganic chlorides, subsequently heating the remaining solution to precipitate the glutamic acid as glutamic acid hydrochloride, and purifying the precipitated glutamic acid hydrochloride by dissolving it in water, separating it from admixed carbon, and precipitating the glutamic acid as hydrochloride from the resulting solution.

In testimony whereof I affix my signature.

DONALD K. TRESSLER.